Figures 1, 7:
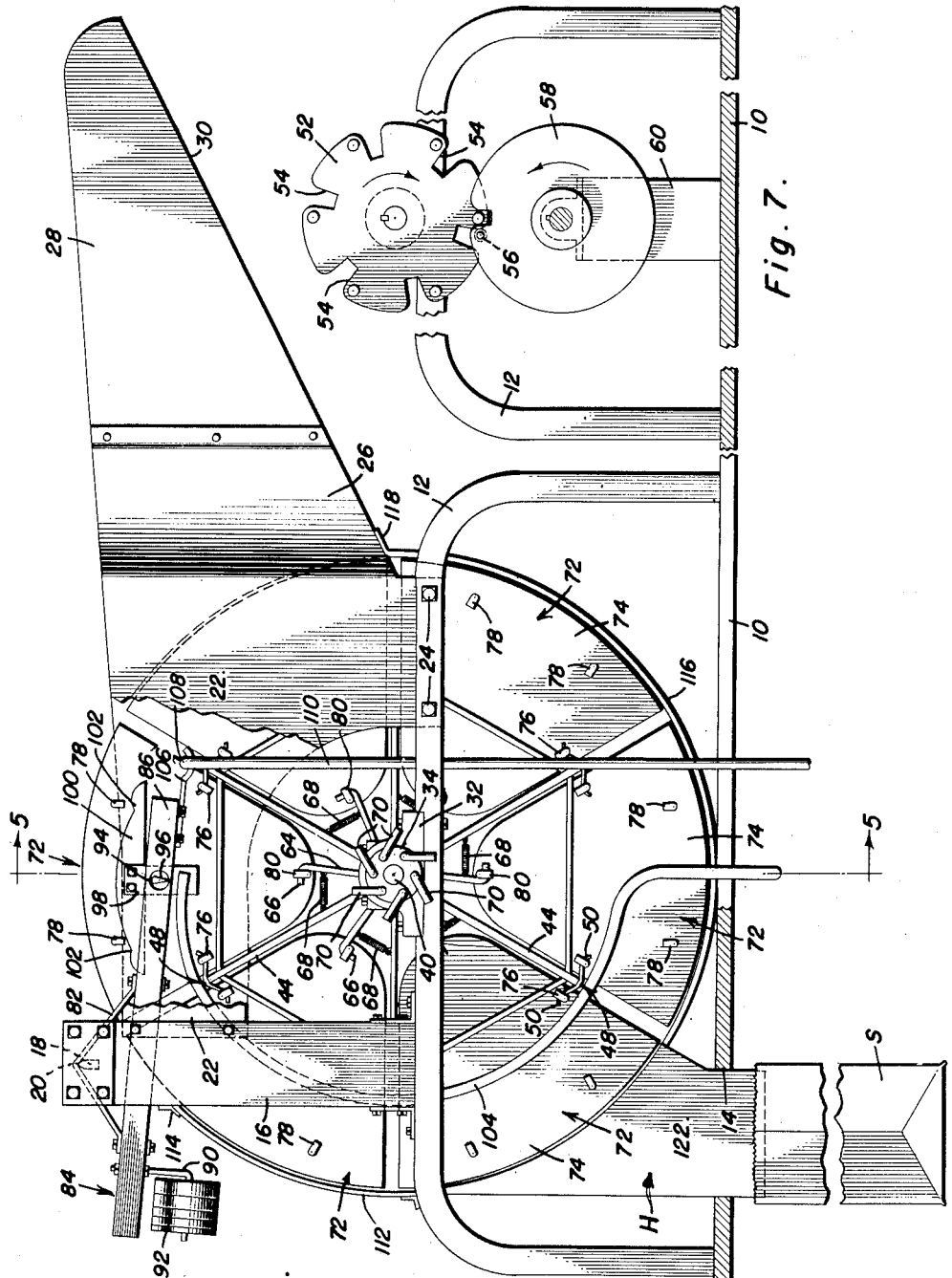

June 9, 1953 C. B. McHALE ET AL 2,641,459
WEIGHING APPARATUS
Filed March 15, 1949 4 Sheets-Sheet 1

Clifford B. McHale
Emil H. Janssen
INVENTORS

BY Thomas A. O'Brien
and Harvey B. Jackson
Attorneys

June 9, 1953   C. B. McHALE ET AL   2,641,459
WEIGHING APPARATUS
Filed March 15, 1949   4 Sheets-Sheet 2
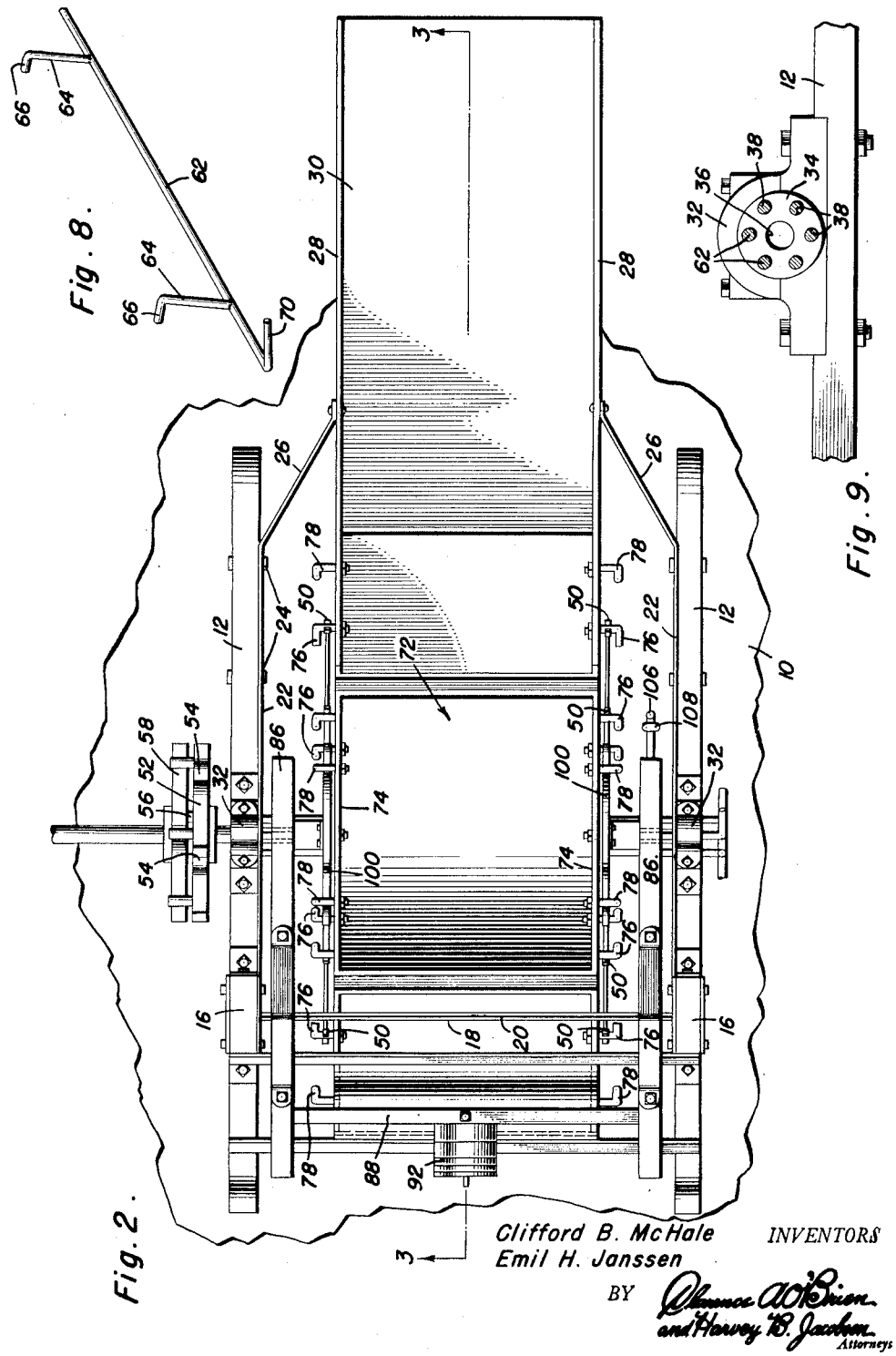
Clifford B. McHale   INVENTORS
Emil H. Janssen
BY
Clarence A. O'Brien
and Harvey B. Jacobson
Attorneys

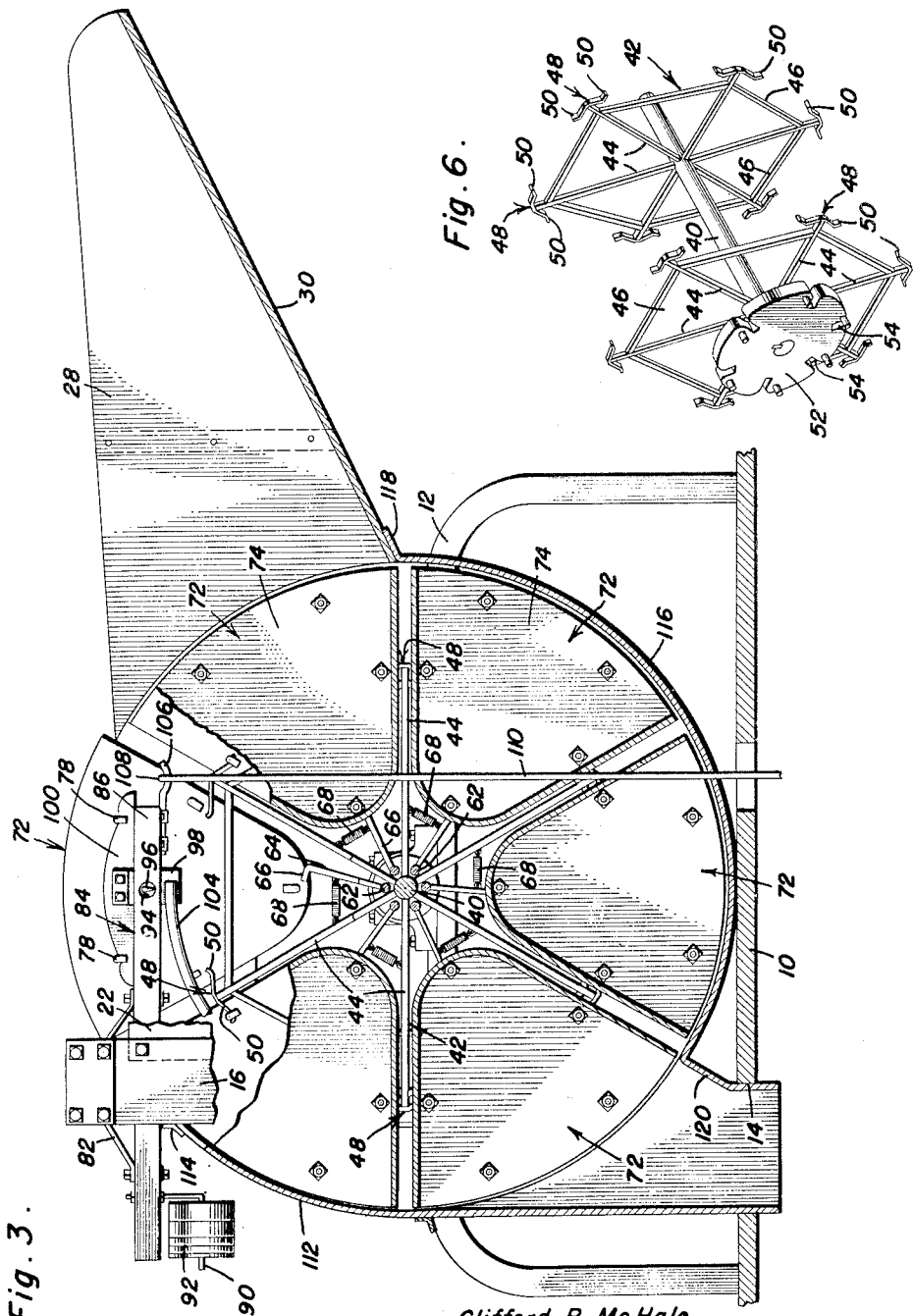

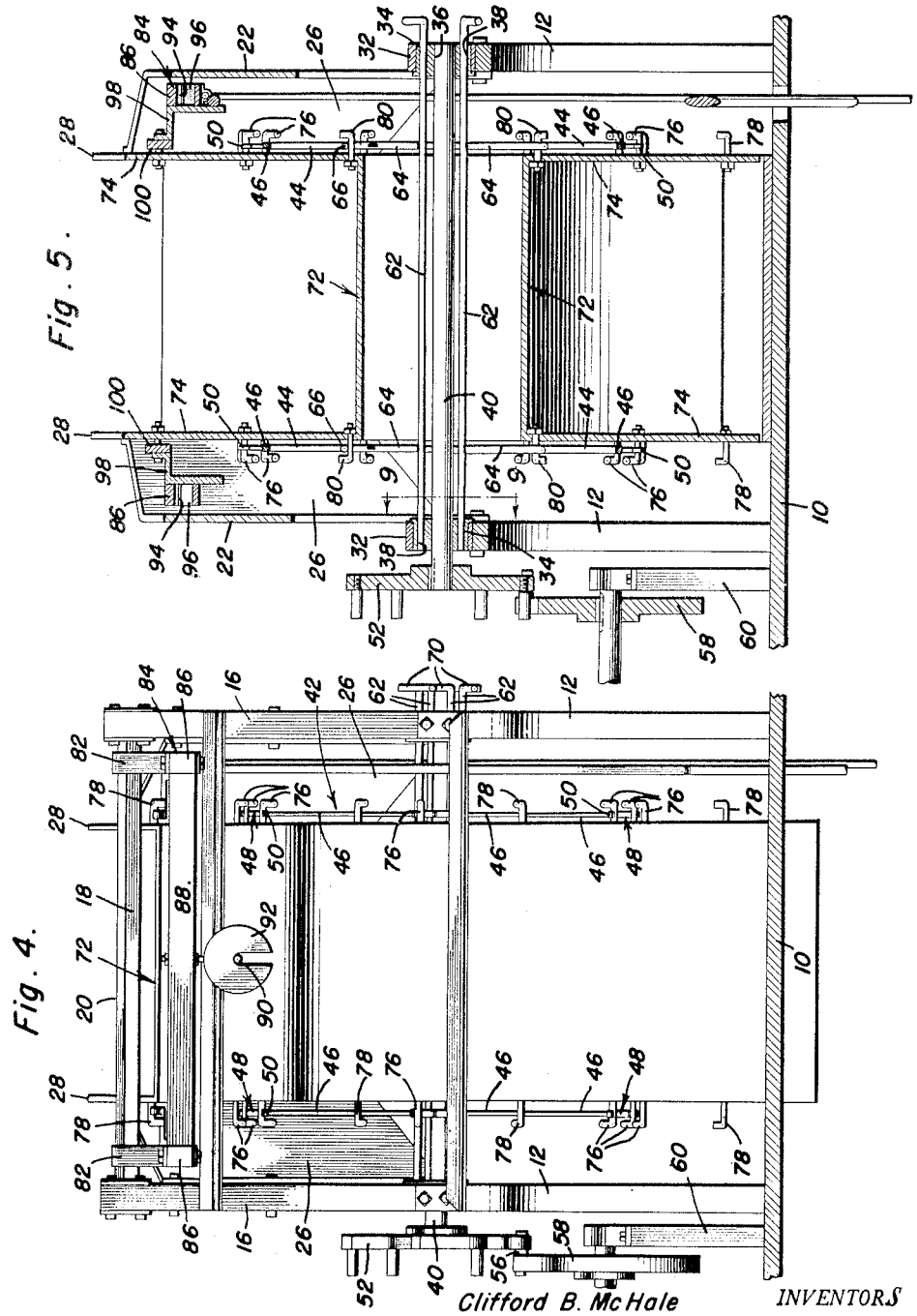

Patented June 9, 1953

2,641,459

UNITED STATES PATENT OFFICE 2,641,459

WEIGHING APPARATUS

Clifford B. McHale and Emil H. Janssen, Torrington, Wyo.; said Janssen assignor to said McHale Application March 15, 1949, Serial No. 81,430

8 Claims. (Cl. 265—27)

This invention relates to weighing apparatus and more particularly to apparatus for weighing a charge of material and subsequently depositing the weighed charge in suitable sacks of an automatic packaging machine.

The primary object of the invention is to measure out a charge of articles to be packaged, weigh the charge, and subsequently to move it to a point of discharge from which it is directed to a suitable container such as a paper sack.

Another object is to perform the loading, weighing and discharging operations automatically and in sequence, and to enable the weight of the load to be increased or decreased in accordance with a predetermined standard of measure.

A still further object is to advance article receiving buckets past a filling hopper to a weighing station, to weigh the buckets and their contents in succession at the weighing station, and subsequently to discharge the contents of the buckets in sequence as they move in a closed path.

The above and other objects may be attained by employing this invention which embodies among its features a scale beam mounted to rock about a horizontal axis, a pair of spaced parallel cradles carried by the scale beam, a group of buckets mounted to move in a closed path between said cradles, and hooks carried by each of said buckets, said hooks projecting laterally from said buckets and moving therewith for engaging said cradles and supporting their respective buckets on the scale beam.

Other features include means connected to the scale beam to rock it about the horizontal axis and move the cradles out of the paths of movement of the hooks.

Still other features include means for disengaging a bucket supported on the cradles from the bucket moving means, and means adjacent the scale beam for loading a bucket immediately prior to its movement between the cradles.

Still more detail features of the invention embody a bucket carrier mounted beneath the scale beam to rotate about parallel horizontal axis below the cradles, buckets mounted in the carrier to move radially thereof, releasable means carried by the carrier for holding the buckets against radial movement, said buckets being movable by said carrier in a closed path between the cradles, hooks carried by the buckets and projecting laterally therefrom for engaging the cradles and supporting their respective buckets on the scale beam, and means to release the releasable means while a bucket is supported on the scale beam.

In the drawings:

Figure 1 is a side view of a weighing apparatus embodying the features of this invention, certain portions thereof being broken away more clearly to illustrate certain details of construction, Figure 2 is a top plan view of the apparatus illustrated in Figure 1, Figure 3 is a longitudinal vertical sectional view taken substantially along the line 3—3 of Figure 2, showing portions of the buckets in elevation, Figure 4 is an end view of the weighing apparatus from the scale beam end of the device, Figure 5 is a vertical sectional view taken substantially along the line 5—5 of Figure 1, Figure 6 is a perspective view of the bucket carrier, Figure 7 is a fragmentary side view partly in section showing the indexing means for the bucket carrier, Figure 8 is a perspective view of one of the bucket locking members, and Figure 9 is a fragmentary vertical sectional view taken substantially along the line 9—9 of Figure 5.

Referring to the drawings in detail, a platform 10 supports a pair of spaced parallel arches 12, and formed in the platform 10 between the arches is an opening 14. Rising upwardly from each arch 12 adjacent the end thereof nearest the opening 14 in the platform 10 is a standard 16, and connected to the standards 16 adjacent their upper ends and extending transversely of the machine between said standards is a horizontal bar 18 having an upwardly directed knife edge 20 on which is suspended a scale beam to be more fully hereinafter described.

Attached to the outer sides of the standards 16 are side brackets 22 which are bolted or otherwise connected to the arches 12 as at 24, and are provided adjacent their ends remote from the standards 16 with converging arms 26, the convergent ends of which are riveted or otherwise attached to the side walls 28 of a feed trough 30, which projects beyond the ends of the arches 12 remote from the standards 16, and inclines downwardly as it approaches the arches to a level slightly above the upper ends of said arches. Mounted on the arches 12, intermediate their ends, are suitable pillow blocks 32, the purpose of which will be more fully hereinafter explained.

Mounted for rotation in the pillow blocks 32 are bushings 34 each of which is provided with an axial opening 36, and an annular row of circumferentially spaced openings 38 the purpose of which will more fully hereinafter appear. Fixed in the axial openings 36 of each bushing 34 is the shaft 40 of a bucket carrier designated generally 42. This bucket carrier includes the shaft 40 from longitudinally spaced points of which radiate spokes 44, and joining the spokes adjacent their outer ends are brace bars 46. Carried at the outer end of each spoke 44 is a bucket supporting hook designated generally 48 which comprises oppositely extending resilient arms 50 which lie perpendicular to the shaft 40 and form supports for the buckets to be more fully hereinafter described.

As will be readily understood, the carriage 42 is mounted to rotate adjacent the discharge mouth of the feed trough 30. A suitable drive wheel 52 is fixed to one end of the shaft 40 for rotation in unison therewith and this drive wheel is provided at circumferentially spaced points with peripheral notches 54 for the reception of a crank pin 56 carried by a crank disk 58 which is mounted to rotate on a standard 60 carried by the platform 10 adjacent one side of the machine. It will thus be seen that when the crank disk 58 is rotated, the crank pin 56 will periodically move into engagement with a notch 54 so as to drive the shaft 40 and carriage 42 with a step by step movement.

Mounted for rotation in the aligned openings 38 of the bushings 34 is an annular series of rock shafts 62 each of which carries intermediate its ends spaced radially extending releasable fingers 64 carrying at their ends remote from their respective shafts 62 angularly extending lugs 66. These lugs 66 and the fingers 64 are spaced from one another on each rock shaft 62 a distance substantially equal to the distance between the longitudinally spaced radial spokes 44 of the carrier 42 and are designed to oscillate between the spokes 44 as will be readily understood upon reference to Figures 1 and 3. A retractile coil spring 68 is coupled to each finger 64 intermediate the ends thereof, and to a spoke 44 to exert pull on the respective finger in a direction to advance its respective lug 66. An actuating lever 70 is carried at one end of each rock shaft 62 to enable its respective shaft to be moved against the effort of its respective spring 68.

Fitted in the carrier 42 are buckets designated generally 72 which are generally of segmental shape with the side walls 74 thereof equipped with hook elements 76 which project laterally therefrom and engage the opposite ends 50 of the bucket-supporting hooks 48. Each side wall 74 of each bucket 72 is equipped with a pair of hook elements 76 and carried by each side wall 74 of each bucket 72 in outwardly spaced relation from the hook elements 76 are L-shaped cradle engaging lugs 78 which serve to suspend their respective buckets on the cradles during the weighing operation as will be more fully hereinafter explained.

In order to retain the buckets 72 in their respective positions in the carrier 42, with the hook elements 76 contacting the bucket-supporting hooks 48, each bucket is provided adjacent its inner convergent end on opposite side walls with laterally projecting angulated arms 80 which are adapted to be engaged by the lugs 66 of the fingers 64 carried by the rock shafts 62. It will thus be seen that the buckets may be rotated about the shaft 40 within the carrier 42 when the lugs 66 of the fingers 64 are moved under the influence of the springs 68 into engaged relation with the angulated arms 80, but may be released when the rock shafts 62 are rotated by movement of the hand levers 70 against the effort of the springs 68.

Suspended for rocking movement as by straps 82 on the knife edge 20 of the bar 18 is a scale beam designated generally 84. This scale beam comprises a pair of spaced parallel bars 86 which are joined by a cross bar 88 carrying an L-shaped supporting arm 90 upon which balance weights 92 are supported. These weights are graded in accordance with conventional practice to provide different weight measures. Each bar 86 is provided adjacent its end remote from the cross bar 88 with an opening 94 for the reception of a knife edge 96 which is carried by and extends laterally from an inwardly extending bracket 98. Each bracket 98 carries at its inner end a cradle 100 which lies in the path of movement of the lugs 78 on its respective side of the machine. Each cradle 100 is provided adjacent each end with a notch 102 in which the lugs 78 of a vertically disposed bucket 72 are received during the weighing operation. Fixed to each bracket below the knife edge 96 thereof is a curved arm 104 which serves as a counterweight to maintain the cradles 100 in a horizontal position at all times. A finger element 106 is carried by one of the arms 86 and projects longitudinally therefrom at the end remote from the cross bar 88, and coupled to the finger element 106 as by an eye 108 is a pull rod 110 by means of which the scale beam 84 may be tilted downwardly to lower a bucket 72 which has been suspended on the cradles 100 so as to return it to a position where the hook elements 76 thereof engage the bucket-supporting hooks 48, thereby to return a filled and weighed bucket to its position on the carrier 42.

In order to retain the contents of a weighed bucket therein during the rotation of the carrier 42, a suitable curved guard plate 112 is attached adjacent one end to a cross bar 114 carried adjacent the upper ends of the standards 16 while the lower end of the guard plate 112 extends downwardly through the opening 14 in the platform 10 as will be readily understood upon reference to Figure 3. A similar curved guard plate 116 extends around the underside of the carrier in close proximity to the outer edges of the sides of the buckets 72, and one end of the guard plate 116 is coupled as by a flange 118 to the bottom of the trough 30, while the opposite end of the guard plate 116 is bent outwardly and downwardly as at 120 and projects through the opening 14 against the wall thereof remote from the lower end of the guard plate 112. Side walls 122 close the spaces between opposite side edges of the guard plates 112 and 116 to form in conjunction with the lower ends thereof a discharge hopper H by which the weighed contents of a bucket is directed into a suitable sack S.

In use, the crank disk 58 is rotated in any conventional manner to cause the crank pin 56 carried thereby to engage in the notches 54 of the drive wheel 52, thus to index the drive wheel 52 and cause the carrier 42 to move the buckets 72 with a step by step motion to the various positions about the axis of the shaft 40. It will be understood, of course, that there are as many notches in the wheel 52 as there are buckets in the carrier so that a bucket will be moved into a filling position before the feed trough 30 while the next preceding bucket is moved into a position between the bars 86 of the scale beam 84. Upon movement of a filled bucket to the position between the bars 86 of the scale beam 84, the actuating lever 70 which operates the lugs 66 of that respective bucket is rocked against the effort of the springs 68 so that the bucket will be suspended by the lugs 78 on the cradles 100, it being understood that pull on the pull rod 110 has been released to permit the scale beam 84 to move under the influence of the weights 92 into bucket supporting position. The suspension of the bucket on the cradles 100 of the scale beam 84 enables the operator to add to or detract from the contents of the bucket until the proper balance has been achieved, at which time pull is exerted on the pull rod 110 to move the finger element 106 downwardly, thereby rocking the scale beam 84 about the knife edge 20, and returning the bucket 72 containing the accurately weighed contents to its position in the carrier 42 so that the hook elements 76 engage the bucket-supporting hooks 48. Having thus returned the bucket to its position in the carrier, its respective lugs 66 engage the angulated arms 80 thereon to hold the bucket against the bucket-supporting hooks. The carrier is then indexed to move a subsequently filled bucket into a vertical position so that the L-shaped lugs 78 thereof pass above the cradles 100 and into a position to be engaged by the cradles when pull is released on the pull rod 110. With the movement of the subsequently filled bucket into a position to be suspended on the scale beam 84, the previously filled and weighed bucket moves to a position opposite the feed trough 30, with the contents thereof held therein by the guard plate 112. Upon further indexing of the carrier 42, it is evident that the first weighed and filled bucket will move downwardly into a position to discharge the contents thereof through the hopper H defined by the lower end of the guard plate 112 and the angular extension 120 of the guard plate 116 into a sack S (Figure 1) supported beneath said hopper. In this way accuracy of the weight of the contents of sacks supported beneath the hopper is achieved and the operation of the device is sequential in that the hopper is filled and the contents weighed and subsequently discharged into suitable packages.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. Weighing apparatus comprising a scale beam mounted to rock about a horizontal axis, a pair of spaced parallel cradles carried by the scale beam, an annular group of segmental shaped buckets mounted to move about a horizontal axis between the cradles, each bucket having a wholly open outer end, means for mounting the buckets for rotation and to permit radial movement thereof, means for moving the buckets radially relative to the last-mentioned horizontal axis, releasable means holding said buckets against radial movement; and lugs on each side of each bucket, said lugs projecting laterally from said buckets and engaging the cradles to support their respective buckets on the scale beam.

2. Weighing apparatus comprising a scale beam mounted to rock about a horizontal axis, a pair of spaced parallel cradles carried by the scale beam, a bucket carrier mounted beneath the scale beam to rotate about a parallel horizontal axis below the cradles, buckets mounted in the carrier to move radially thereof, releasable means carried by the carrier for holding the buckets against radial movement, said buckets being movable by said carrier in a closed path between the cradles, lugs carried by the buckets and projecting laterally therefrom for engaging the cradles and supporting their respective buckets on the scale beam; and means engaging the carrier and connected to said releasable means to release the releasable means while a bucket is supported on the scale beam.

3. Weighing apparatus comprising a scale beam mounted to rock about a horizontal axis, a pair of spaced parallel cradles carried by the scale beam, a bucket carrier mounted beneath the scale beam to rotate about a parallel horizontal axis below the cradles, buckets mounted in the carrier to move radially thereof, releasable means carried by the carrier for holding the buckets against radial movement, said buckets being movable by said carrier in a closed path between the cradles, lugs carried by the buckets and projecting laterally therefrom for engaging the cradles and supporting their respective buckets on the scale beam, means engaging the carrier and connected to said releasable means to release the releasable means while a bucket is supported on the scale beam; and means connected to the scale beam to rock it about the horizontal axis and move the cradles out of engagement with the lugs.

4. Weighing apparatus comprising a scale beam mounted to rock about a horizontal axis, a pair of spaced parallel cradles carried by the scale beam, a bucket carrier mounted beneath the scale beam to rotate about a parallel horizontal axis below the cradles, bucket supporting hooks on the carrier, buckets supported on said hooks and movable radially toward the periphery of the carrier, releasable fingers carried by the carrier for holding the buckets against radial movement, said buckets being movable by the carrier in a closed path between the cradles; and lugs on the buckets for engaging the cradles and supporting a bucket on the scale beam upon release of the fingers.

5. Weighing apparatus comprising a scale beam mounted to rock about a horizontal axis, a pair of spaced parallel cradles carried by the scale beam, a bucket carrier mounted beneath the scale beam to rotate about a parallel horizontal axis below the cradles, bucket supporting hooks on the carrier, buckets supported on said hooks and movable radially toward the periphery of the carrier, releasable fingers carried by the carrier for holding the buckets against radial movement, said buckets being movable by the carrier in a closed path between the cradles, lugs on the buckets for engaging the cradles and supporting a bucket on the scale beam upon release of the fingers; and means connected to the scale beam for rocking it about the horizontal axis to move the cradles downwardly and replace a weighed bucket on to the bucket supporting hooks on the carrier.

6. Weighing apparatus comprising a scale beam mounted to rock about a horizontal axis, a pair of spaced parallel cradles carried by the scale beam, a bucket carrier mounted beneath the scale beam to rotate about a parallel horizontal axis below the cradles, buckets mounted in the carrier to move radially thereof, releasable means carried by the carrier for holding the buckets against radial movement, said buckets being movable by said carrier in a closed path between the cradles, lugs carried by the buckets and projecting laterally therefrom for engaging the cradles and supporting their respective buckets on the scale beam, means connected to said releasable means to release said releasable means while a bucket is supported on the scale beam, means connected to the scale beam to rock it about the horizontal axis and move the cradles out of engagement with the lugs; and means adjacent the scale beam for loading a bucket immediately prior to its movement between the cradles.

7. Weighing apparatus comprising a scale beam mounted to rock about a horizontal axis, a pair of spaced parallel cradles carried by the scale beam, a bucket carrier mounted beneath the scale beam to rotate about a parallel horizontal axis below the cradles, bucket supporting hooks on the carrier, buckets supported on said hooks and movable radially toward the periphery of the carrier, releasable fingers carried by the carrier for holding the buckets against radial movement, said buckets being movable by the carrier in a closed path between the cradles, lugs on the buckets for engaging the cradles and supporting a bucket on the scale beam upon release of the releasable fingers; and means adjacent the scale beam for loading a bucket immediately prior to its movement between the cradles.

8. Weighing apparatus comprising a scale beam mounted to rock about a horizontal axis, a pair of spaced parallel cradles carried by the scale beam, a bucket carrier mounted beneath the scale beam to rotate about a parallel horizontal axis below the cradles, bucket supporting hooks on the carrier, buckets supported on said hooks and movable radially toward the periphery of the carrier, releasable fingers carried by the carrier for holding the buckets against radial movement, said buckets being movable by the carrier in a closed path between the cradles, lugs on the buckets for engaging the cradles and supporting a bucket on the scale beam upon release of the releasable fingers, means connected to the scale beam for rocking it about the horizontal axis to move the cradles downwardly and to permit replacement of a weighed bucket onto the bucket supporting hooks on the carrier; and means adjacent the scale beam for loading a bucket immediately prior to its movement between the cradles.

CLIFFORD B. McHALE.
EMIL H. JANSSEN.

References Cited in the file of this patent

UNITED STATES PATENTS

| Number | Name | Date |
|---|---|---|
| 344,148 | Wade | June 22, 1886 |
| 1,001,503 | Cardwell | Aug. 22, 1911 |